Sept. 29, 1970          J. A. STALEY          3,531,790

ENERGIZED LINE INDICATOR

Filed Dec. 16, 1966

INVENTOR
Jerry A. Staley

BY
Hovey, Schmidt, Johnson & Hovey.
ATTORNEYS.

3,531,790
ENERGIZED LINE INDICATOR
Jerry A. Staley, Centralia, Mo., assignor to A. B. Chance
Company, Centralia, Mo., a corporation of Missouri
Filed Dec. 16, 1966, Ser. No. 602,393
Int. Cl. G08b 21/00
U.S. Cl. 340—248    10 Claims

ABSTRACT OF THE DISCLOSURE

A silicon controlled rectifier senses the electrical condition of a high voltage power line, i.e., whether the line is dead or live, and initiates an audible alarm when the line changes from live to dead status or vice versa. A pickup element is connected to the gate of the SCR and is attached to the line at the site of use. A relay configuration repeatedly momentarily breaks the cathode-anode circuit of the SCR to permit the latter to assume its non-conductive state when the line changes from live to dead status.

---

There are instances in power line maintenance operations where a line crew may be performing maintenance work on an energized line when the power flow is interrupted for some reason at a location remote from the work site. The load dispatcher cannot reclose breakers to re-energize the line, however, because of possible danger to the workmen. Thus, it is required that the dispatcher contact the line crew and determine if they are in difficulty or if it is safe to re-energize the line. In some instances, particularly in remote areas, this may involve an appreciable delay in attempting to restore service where several line crews are at work at different sites.

It is, therefore, the primary object of this invention to provide an indicator device for use by linemen which will indicate a change in the electrical condition of the line from live to dead or dead to live so that the workmen will be made aware of the energization condition of the line at all times. Thus, when a change in condition is thereby noted by the lineman, it can immediately be reported to the dispatcher.

As a corollary to the foregoing object, it is an important aim of the instant invention to provide such a device which is portable and easily installed at the work site by making a single connection to the power line.

Another important object is to provide a device as aforesaid which may be selectively set by an operator to respond to a change in the energization condition of the line from live to dead or dead to live, and which is capable of discriminating between power voltage and induced voltage on the line.

A further object is to provide an indicator device of this type having a minimum number of parts and which utilizes reliable, relatively inexpensive components throughout.

Figure 1:
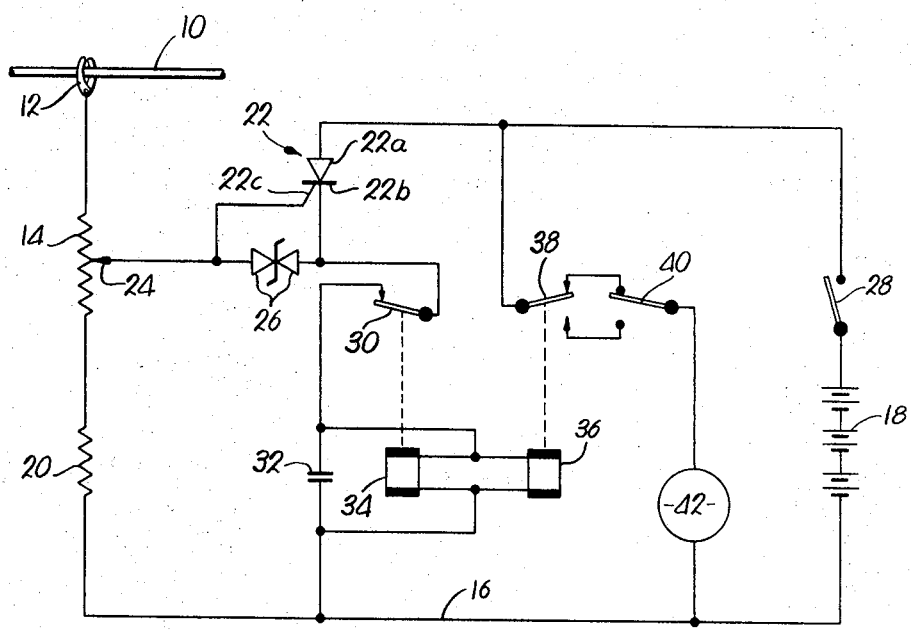
FIG. 1 is a schematic diagram of the circuit of the instant invention.

Referring to FIG. 1, a high voltage AC power line conductor is illustrated at 10, a pickup element 12 in the form of a conductor clamp being shown attached to conductor 10 and connected to a potentiometer 14. The circuit ground is represented by lead 16 which is at the negative potential of series connected batteries 18. A resistor 20 interconnects potentiometer 14 and lead 16.

A silicon controlled rectifier 22 has an anode 22a, a cathode 22b, and a gate 22c, the latter being connected to the wiper 24 of potentiometer 14. A pair of back-to-back Zener diodes 26 are connected across cathode 22b and gate 22c to protect the SCR and other components of the circuitry to be described from transients due to accidental flashovers or arcing which could occur as a result of lightning or man-made faults on the power line system.

The positive side of source 18 is connected to anode 22a through an on-off switch 28, the cathode 22b being connected to lead 16 through a normally closed relay switch 30 in series with a capacitor 32. Switch 30 is under the control of a DC relay coil 34 connected in parallel with capacitor 32. An AC relay coil 36 is in parallel with coil 34 and operates a single-pole, double-throw switch 38 shown in its normal position. The contacts of switch 38 are connected to corresponding contacts of a single-pole, double-throw selector switch 40, switches 38 and 40 controlling the energization of an alarm 42 powered by source 18.

Figure 2:
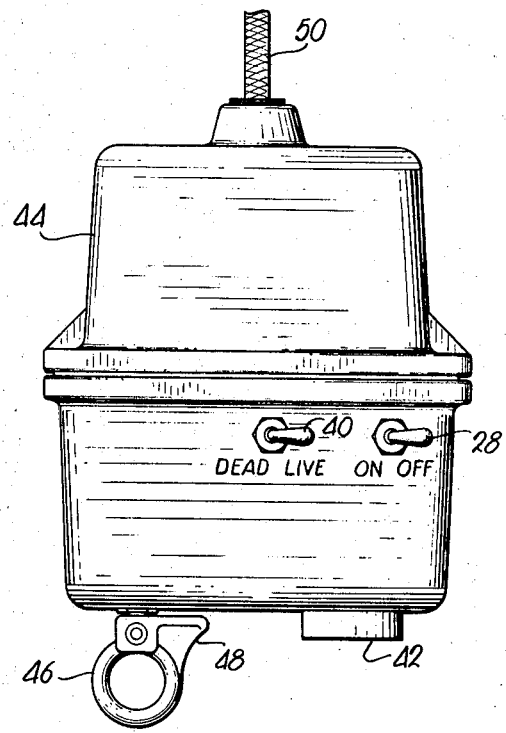
FIG. 2 is a perspective view of a suitable case for housing the circuitry.

A metal case 44 for the circuitry of FIG. 1, including the batteries 18, is shown in FIG. 2, lead 16 being connected to case 44 therewithin to establish the potential of the case at circuit ground. An eyebolt type control 46 is provided for adjusting wiper 24 through the use of a live line tool. In order to give an indication of the setting of control 46, a pointer 48 projects threfrom. A portion of the housing of alarm 42 is visible in FIG. 2, as well as on-off switch 28 and selector switch 40. A cable 50 is shown extending from case 44 for the purpose of connecting potentiometer 14 with clamp element 12.

Alarm 42 may comprise any suitable enunciator capable of delivering readily audible and distinguishable sound upon energization. Various types of audio oscillators are suitable for this purpose.

The device operates on the capacitance voltage divider principle and employs electrostatic potential sensing as a means of determining the electrical condition of conductor 10. With clamp 12 attached to conductor 10 and selector switch 40 in the "live" position illustrated, actuation of switch 28 to the "on" position will cause SCR 22 to go into conduction if conductor 10 is energized. Alarm 42 does not sound since relay coil 36 is energized and holds switch 38 in engagement with its lower contact, thereby breaking the energizing circuit to the alarm. As will be discussed in greater detail hereinafter, removal of voltage from conductor 10 will effect return of SCR 22 to its normal, nonconductive state, thereby deenergizing coil 36 and connecting alarm 42 directly across source 18. It will be appreciated, therefore, that the placing of selector switch 40 in the "live" position renders the device capable of sounding an alarm when a power line changes from live to dead status; the converse is true when switch 40 is in the "dead" position.

In connecting the device to a live line, wiper 24 should be at a low setting (toward the lower end of potentiometer resistor 14). When clamp 12 is attached to conductor 10, alarm 42 will sound if the setting of wiper 24 is too low to develop a voltage between wiper 24 and lead 16 of a level sufficient to gate SCR 22. Wiper 24 is advanced until the alarm is silent, signifying that the circuitry is now in operation with relay coil 36 energized.

The energy received from conductor 10 by clamp 12 causes a current of low value to flow from the clamp to lead 16. This occurs by virtue of the capacitance voltage divider principle, which may be visualized as two capacitors in series, the common plate of the capacitors corresponding to circuit ground 16 while the outer plates correspond to line conductor 10 and the earth respectively. The current flowing in potentiometer 14 and resistor 20, although small, is of sufficient magnitude to effect gating of SCR 22, the minimum line voltage capable of being sensed by the circuitry being on the order of 2000 volts.

The greater the line voltage the closer wiper 24 is set toward the bottom end of the potentiometer resistor 14.

When SCR 22 is gated, the circuit through the two switching terminals formed by anode 22a and cathode 22b is closed to energize the AC relay coil 36 and commence the charging of capacitor 32. A half wave, pulsating component is present in the circuit through the relay coils and capacitor 32 due to the current from conductor 10 conducted through the gate-cathode junction of SCR 22. Capacitor 32 lengthens the circuit time constant and thus reduces the pull-in rate of the DC relay coil 34. When the voltage across capacitor 32 reaches a level sufficient to energize coil 34, switch 30 opens to break the circuit and discharge capacitor 32. Therefore, coil 34 remains energized momentarily, and then drops out to reclose switch 30. Therefore, as long as excitation remains available at gate 22c, the relay 30, 34 cycles back and forth several times per second but at a considerably slower rate than the 60 Hz. frequency of the AC power on conductor 10.

The AC relay coil 36 is selected to have less resistance than coil 34. During the momentary interruptions of the circuit through switch 30 when capacitor 32 is discharging, the energy from the capacitor is sufficient to maintain coil 36 energized. Manifestly, the AC coil 36 substantially uneffected by the pulsating current component; therefore, coil 36 remains energized at all times until the circuit is broken for a time duration sufficient to discharge capacitor 32 to a level which will no longer sustain coil 36.

A permanent interruption of the circuit through switch 30 will occur when conductor 10 goes dead, since excitation will no longer be available at gate 22c. Thus, alarm 42 is energized by the de-energization of relay coil 36 and the return of switch 38 to the normal position shown. It will be appreciated, therefore, that SCR 22 is repeatedly placed in an excitation-sensing state by the momentary opening of switch 30, in which state the SCR senses whether or not conductor 10 is still live. A change to dead status, or a substantial drop in voltage on conductor 10, causes the SCR to remain in its nonconductive state when switch 30 recloses, while continued availability of excitation at gate 22c causes the SCR to assume its conductive state to repeat the cycle as long as the conductor remains live.

For dead-line operation, selector switch 40 is moved to the "dead" position in engagement with its lower contact (FIG. 1) so that, should conductor 10 become energized, gating of SCR 22 will effect energization of alarm 42 by the operation of relay switch 38.

Additionally, the device can be used to determine if high voltage, induced potentials exist on a supposedly dead line. The selector switch 40 is placed in the "dead" position and control 46 is rotated until pointer 48 indicates the minimum voltage (greatest resistance between wiper 24 and lead 16). If, when clamp 12 is connected to the line, alarm 42 sounds, selector switch 40 is reset to the "live" position and control 48 is rotated, using a live line tool, until the alarm again sounds. If the value indicated by pointer 48 is approximately one-half the normal phase voltage, or less, the line is carrying induced voltage of the approximate value indicated and grounding equipment must be installed with caution to avoid undue conductor damage from discharge of the induced currents.

Having thus described the invention, what is claimed as new and desired to be secured by Letters Patent is:

1. A device for indicating the electrical condition of a high voltage line, said device comprising:
   a source of electrical power;
   electrically responsive, bistate apparatus coupled ith said source;
   a pickup element adapted for disposition in energy-receiving relationship to said line and coupled with said apparatus for applying excitation thereto when said line is live,
   said apparatus having a normal state in which the apparatus is capable of sensing the application of said excitation thereto, and an operated state assumed in response to sensing of said excitation in which the apparatus establishes a current-carrying circuit energised by said source,
   said apparatus further having means responsive to current flow in said circuit for returning the apparatus to said normal state, whereby the apparatus cycles between said states and repeatedly momentarily interrupts said current flow as long as excitation is available from said element;
   an electrically initiated alarm; and
   control means coupled with said circuit and said alarm for maintaining the latter inoperative as long as said current flow is only subject to said momentary interruptions,
   said control means effecting energization of said alarm in response to termination of said current flow for a duration longer than said momentary interruptions, whereby operation of the alarm indicates a change in the condition of said line from live to dead.

2. The invention of claim 1,
   said source comprising a battery, whereby to render the device portable for use at a work site along the line.

3. The invention of claim 1,
   said control means including selectively operable means for reversing the operation of the control emans to cause the latter to effect energization of said alarm only when said current flow is established in said circuit whereby, during such reversed operation of the control means, actuation of the alarm indicates a change in the condition of the line from dead to live.

4. The invention of claim 1,
   said apparatus including an electrically controllable switching component having a control terminal, and a pair of switching terminals between which the component is normally nonconductive,
   said element being coupled with said control terminal,
   said component being operable to establish electrical continuity between said switching terminals to close said circuit upon application of excitation to the control terminal by said element.

5. The invention of claim 4,
   said component comprising a silicon controlled rectifier having a cathode and an anode presenting said switching terminals, and a gate presenting said control terminal.

6. The invention of claim 4,
   said component establishing said continuity between the switching terminals in response to control terminal excitation of at least a predetermined level,
   there being variable impedance means coupled with said control terminal for controlling the magnitude of the excitation delivered to the control terminal by said element, whereby the sensitivity of the apparatus may be set in accordance with the voltage of the line.

7. The invention of claim 4,
   said returning means including an electromechanical relay having a coil and a normally closed switch interposed in said circuit,
   said component interrupting said continuity between the switching terminals in response to opening of said switch, whereby the coil is cyclically energized and de-energized as long as excitation is available at said control terminal, but maintained de-energized by said component when said excitation ceases as the line goes dead.

8. The invention of claim 7,
   said returning means further including means coupled with said coil and responsive to said current flow for delaying operation of said relay.

9. The invention of claim 7,
said control means including a second electromechanical relay having a coil coupled with said circuit and a switch coupled with said alarm for controlling operation of the latter, and means connecting said alarm and the switch of said second relay in series relationship across said source,
there being means in said circuit maintaining said coil of the second relay energized during each interruption of said current flow occurring as the coil of the first-mentioned relay is cyclically energized and de-energized.

10. The invention of claim 9,
said control means further including a selector switch coupled in series with the switch of said second relay and having a first position rendering the alarm energizable by the second relay upon de-energization of the coil thereof, and a second position rendering the alarm energizable by the second relay upon energization of the coil thereof, whereby the device is selectively responsive to a change in the condition of the line from live to dead or from dead to live.

References Cited

UNITED STATES PATENTS

| | | | |
|---|---|---|---|
| 2,137,349 | 11/1938 | Rezos | 340—253 |
| 3,277,460 | 10/1966 | Heckman | 340—253 |
| 3,289,194 | 11/1966 | King | 340—256 |
| 3,037,161 | 5/1962 | Cummings | 324—72.5 |
| 3,068,409 | 12/1962 | Bigliano et al. | 324—72.5 |
| 3,168,729 | 2/1965 | Volberg. | |
| 3,183,439 | 5/1965 | Rosinek | 324—133 |
| 3,204,183 | 8/1965 | Hasenzahl | 324—133 |
| 3,286,131 | 11/1966 | Myers | 317—31 |
| 3,300,689 | 1/1967 | Beddoes | 317—31 |

THOMAS B. HABECKER, Primary Examiner

D. MYER, Assistant Examiner

U.S. Cl. X.R.

317—139, 142; 340—253